Figure 1:
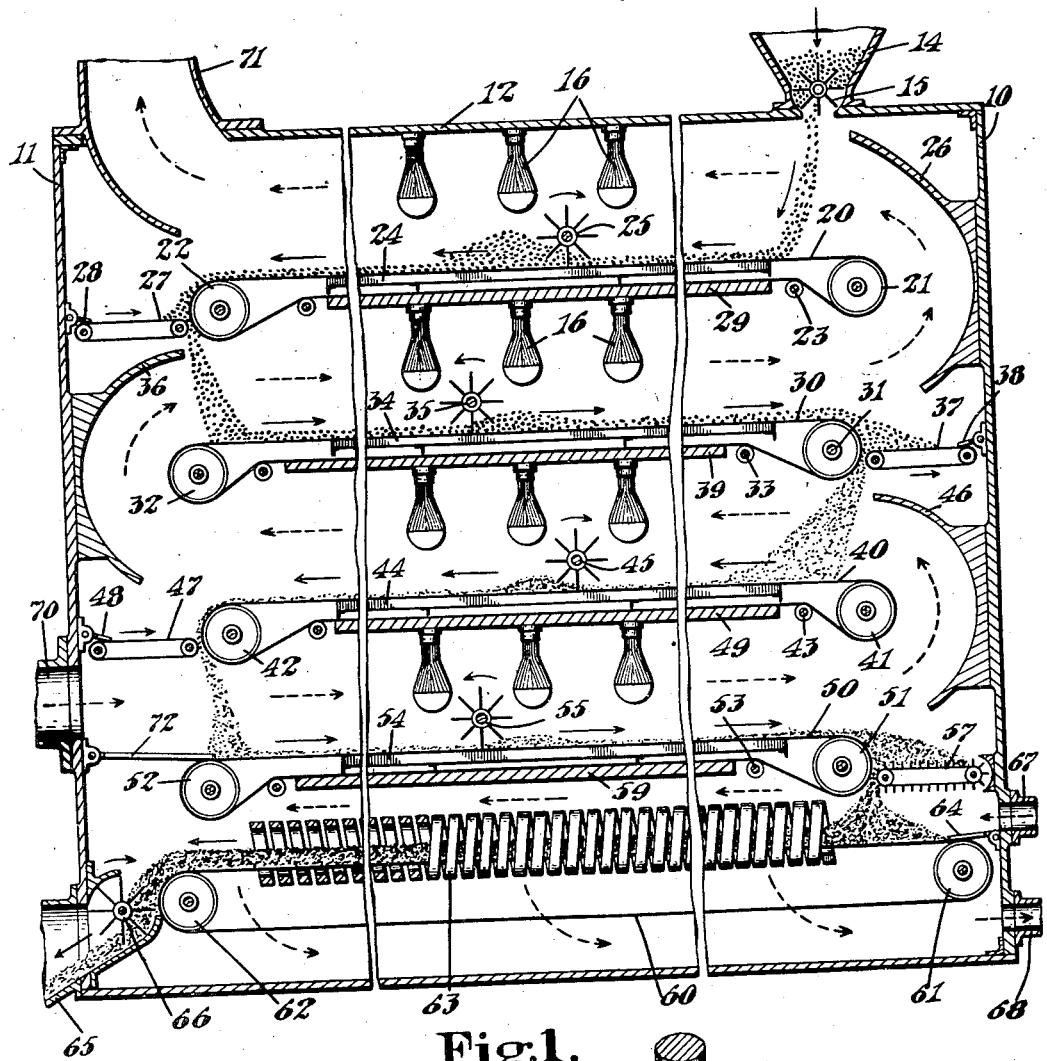

April 29, 1947.  C. BIRDSEYE  2,419,876
DEHYDRATION APPARATUS HAVING CONVEYORS, AGITATORS,
RADIANT HEATERS, AND GAS CIRCULATING MEANS
Filed Sept. 1, 1942  3 Sheets-Sheet 1

INVENTOR
Clarence Birdseye
BY

April 29, 1947. C. BIRDSEYE 2,419,876
DEHYDRATION APPARATUS HAVING CONVEYORS, AGITATORS,
RADIANT HEATERS, AND GAS CIRCULATING MEANS
Filed Sept. 1, 1942 3 Sheets-Sheet 2

INVENTOR
Clarence Birdseye
BY
Hemway & Witter

Patented Apr. 29, 1947

2,419,876

UNITED STATES PATENT OFFICE 2,419,876

DEHYDRATION APPARATUS HAVING CONVEYORS, AGITATORS, RADIANT HEATERS, AND GAS CIRCULATING MEANS

Clarence Birdseye, Gloucester, Mass., assignor to Dehydration, Inc., Gloucester, Mass., a corporation of Massachusetts Application September 1, 1942, Serial No. 456,903

14 Claims. (Cl. 34—57)

1

The present invention consists in new and improved apparatus for use in preparing dried food products from vegetables, fruits and other moist or moisture-containing comestibles other than liquids. It may be advantageously used in carrying out the novel process of my copending application Ser. No. 440,967, filed April 29, 1942. That application discloses and claims a rapid, automatic and inexpensive process of producing dried food products of high quality and in a form familiar and useful to the housewife.

Those processes which are today used to produce probably as much as 98 per cent of the huge quantities of dehydrated vegetables which are being purchased by various Government organizations are slow and expensive in practice, and unduly damage the appearance, aroma, taste, and vitamin content of the food. Most such vegetables are dehydrated in static layers in trays in chambers or tunnels in which all necessary heat is furnished to the product, and moisture vapor carried away from the product, by means of very large quantities of heated air. Because the individual units of food in a static layer are of widely varying shapes and thicknesses and exposed in different degrees to the currents of dehydrating air, it is necessary in apparatus heretofore available to employ relatively high humidities and low temperatures in order to prevent overheating and case-hardening of the quicker-drying units of the mass before the slower-drying units thereof are sufficiently dried. These necessary precautions result in an undue prolongation of the drying time, with resultant relatively poor quality and high production costs. It should always be kept in mind that damage to foods in heat processing is in proportion to the time and temperature (of the product) involved in the process.

I have discovered that under certain conditions of treatment it is possible to dry food products with extreme rapidity, and yet to retain their natural color, flavor, and aroma, all without the complications and expense of frequently adjusted and critically controlled humidity.

The process of my invention is based upon the discovery that, under certain conditions, it is not only practicable but desirable to employ a hot arid gas from the very beginning to the end of the dehydrating treatment to effect continuous rapid removal of surface moisture from the food product. By my process I furnish heat to the interior of the product by either or both conduction and radiation, and thus rapidly drive moisture from the interior to the exterior of the product. Therefore I can dry, without damaging case-hardening, even such large food units as whole apples. However, since moisture loss from the product will increase with the surface-to-bulk ratio of the product units, I prefer to reduce all

2 products to pieces having the greatest surface-to-bulk ratio compatible with the use to which the dried foods will be put by the consumer. The rapid removal of surface moisture cools the product and so permits the employment of a hot arid gas without danger of overheating or scorching. For example, a dehydrating gas at 350 F. may be employed without overheating the product, and dehydration by such hot, very arid gas may proceed safely so long as the surface moisture removed thereby is rapidly and constantly replaced by moisture from the interior of the product, so that the surfaces of the pieces of product remain constantly moist. Under such conditions there can be no objectionable case hardening. The product must be frequently and positively agitated or stirred in order constantly to present fresh surfaces of the product units to the action of the hot arid gas and to the radiant and/or conducted heat. The result of these coordinated steps, or certain of them in combination, is to effect, without case-hardening or overheating, rapid and economical dehydration, and to produce a dried food product of the highest quality in appearance, flavor, aroma, and food value.

As a preliminary step the raw food product may be cut into slices or pieces of the thickness best suited for preparing that particular food for the table. For example, in the case of carrots, slices approximately 3/16" thick are very desirable from that standpoint and accordingly carrots are preliminarily prepared by slicing to that thickness. The sliced product is next blanched preferably by steam treatment, to inactivate the enzymes and partially cook the product without substantial loss of soluble matter. The sliced and blanched product is then delivered to a conveyor in the drying apparatus, said conveyor preferably having a moisture absorbent surface, where the product is at once subjected to a current of hot arid dehydrating gas, preferably much hotter than itself, and is further heated both from beneath through the conveyor surface by conduction and radiation and from above by radiant energy. Under this treatment, and with the aid of frequent stirring, moisture is continually driven outwardly from the interior of the product to maintain moisture on the surface. Consequently a very hot dehydrating gas, for example at a temperature of 350° F. may be employed without danger of damaging the product. Meanwhile in its travel the product is forcibly and repeatedly removed or lifted from and returned to the conveyor surface, the time of uninterrupted contact with the conveyor surface being too short for objectionable adhesion thereto to take place. By this means, also, the product mass is given the necessary stirring to expose fresh surfaces to dehydrating gas currents and to the radiant and/or conducted heat.

There are other important though optional characteristics of my improved process. If maximum speed of dehydration is to be maintained in the case of products consisting of masses of units having different surface-to-bulk ratios, it is essential, during the process, to separate the small or thin pieces or particles of food product which have become dry and to advance the latter rapidly through and out of the zone of treatment. This desirable result is effected in accordance with my invention in large part by the dehydrating gas current which is directed so that it picks up dried particles from the agitated food product and carries these forwardly ahead of the heavier units of the mass under treatment. This not only improves the efficiency of the process but permits the safe employment of hotter and drier gas in treating the remainder of the mass than would otherwise be possible. Furthermore, the frequent strenuous stirring or agitation of the product mass better exposes the product units to the gas current and to radiant energy and conducted heat, and so aids the above-mentioned rapid dehydration and progressive separation of the lighter pieces.

A valuable and economical feature of my novel process is that, since I furnish by means other than the dehydrating gas current a very large proportion of the heat required in the process, the said current need be of only sufficient volume to absorb a small amount of the removed moisture (and this in the lower parts of the apparatus where temperatures may be maintained at less than 212° F.) and to sweep out of the apparatus as steam product moisture removed by portions of the gas current having temperatures higher than the boiling point of water in the apparatus.

Another important advantage of my process is that, while I use arid gas hotter than the product during the early stages, while substantially all the product surfaces are still wet and consequently cooled by rapid evaporation, in the later stages of the process I may employ arid gas cooler than the product to which heat may then be principally furnished by radiation and/or conduction; and by means of the relatively cool gas current prevent overheating and damage to those portions or pieces of the product which have become so dry that they no longer have the protection of a substantial amount of surface moisture.

The present invention consists in apparatus which includes in its structure a conveyor belt or a series of belts and means for distributing food product units loosely in layers thereon, in combination with means for agitating, scattering or tumbling the units in selected areas along the path of travel. The belts are preferably directly heated so that the product units are heated by conduction therefrom. Radiant heaters for heating the product units, and particularly the interior thereof, are arranged at advantageous locations along the belts. Means are also provided for directing a current of hot arid gas or air in a path over or through the product units in their travel with the belts with the double function of removing moisture therefrom and of picking up and advancing the lighter and drier units of the mass at a rate faster than the heavier and moister units of the layer or layers under treatment.

An important feature of the invention consists in its general organization whereby the food product may be introduced in wet or in fresh moist condition where it is first encountered by very hot, arid gas, subjected to gas of progressively less temperature as the product becomes drier, and therefore more liable to damage from overheating, and finally in its driest stage subjected to arid air which is of a temperature not greater than that of the product or even cooler than the product.

It is believed to be broadly new to provide an enclosure having a series of product carrying belts arranged one above another in staggered relation with means for delivering a product to be dehydrated to the uppermost belt in the series, and means for directing a dehydrating current of gas upwardly from one belt to another, flowing over the product in the same direction in which it is advanced by the belts. The advantage of this feature, which is embodied in my novel apparatus, is that by it is brought about the desirable differential air or gas treatment of the product above explained and the gas current is also utilized for the gravity separation or winnowing of the product, picking up and carrying forward the drier units of the mass under treatment while the heavier and moister units proceed more nearly at the slower travel rate of the belts.

An apparatus having these characteristics is valuable because of its great adaptability to handle different food products and different types of food products, this permitting the employment of the apparatus throughout the entire growing season.

An important feature of the apparatus of my invention consists in a conveyor belt of absorbent material adapted to remove free moisture by absorption from the food product units carried thereon. As herein shown the conveyor belt is utilized in a novel combination with heaters which heat the belt directly by conduction and radiation and with other heaters which heat it principally by radiation, with the result that the conveyor belt has several distinct functions in the apparatus, among which are (1) moving the food product along a predetermined path wherein it may be conveniently treated, (2) heating the product units by contact with its hot, dry surface, (3) removing free moisture from the food product by absorption, and (4) passing radiant energy to the product from a source located on the opposite side of the conveyor.

Another feature of the invention consists in a novel form of conveyor belt having a body portion of duck or other moisture-absorbent fabric. The belt of my invention in a preferred form consists in a pair of link-belts running in parallel paths and having the fabric removably suspended between them by hooks spaced every six inches or so from selected links of the link-belt. The fabric may be thus stretched with any desired tension, held flat and securely supported by the hooks which may puncture the fabric at any desired point and which may be readily adjusted or detached as occasion requires. Preferably and as herein shown, the belts may be originally installed with longitudinal plaits or folds and these may be removed or shaken out to increase the effective width of the fabric in case of shrinkage during use.

In a preferred embodiment the apparatus of my invention may include a conveyor belt movable in an enclosure which varies in cross section and thus imparts relatively high velocity to the gas current in certain portions of the path of the belt. This expedient intensifies and improves the gravity separation and more rapid advance of the drier units in process of treatment. If desired this feature may be combined with a discontinuous arrangement of the belt path and with the provision of agitating or mechanical feeding devices.

The apparatus of my invention is herein disclosed as organized to supply a wetting agent to the dehydrated food product units and to compress measured quantities of the product so treated into cakes or pellets. A serious objection to compressed cakes of dehydrated food products as available heretofore has been the length of time required to soften or rehydrate them in preparing them for the table. I have discovered, however, that by adding a small amount of a wetting agent, such as "lecithin," to the hydrated product before it is compressed, a cake is produced which may be softened or rehydrated in a very much shorter time than ever before.

My invention includes within its scope, the novel process of preparing compressed cakes of dehydrated food products which are characterized by the step of adding a wetting agent to the compressed cake either before or after its formation.

Figure 2:
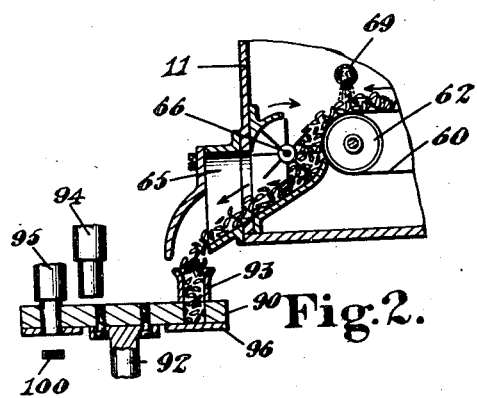
Figure 3:
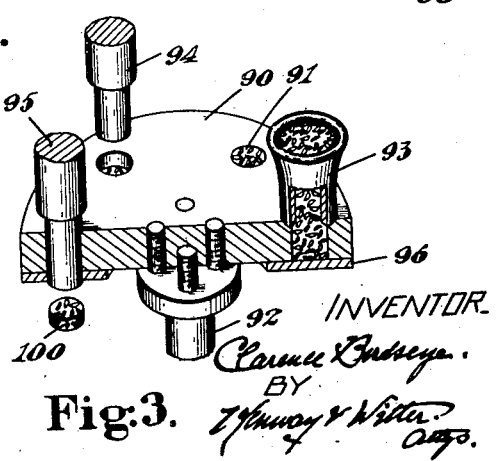

These and other features of my invention will be best understood and appreciated from the following description of a preferred embodiment thereof selected for purposes of illustration and shown in the accompanying drawings in which, Fig. 1 is a diagrammatic view in elevation, partly in section, of the entire apparatus, Fig. 2 is a fragmentary sectional view and Fig. 3 is a perspective view of mechanism for conforming by compression a solid cake of dehydrated product containing wetting agent.

Figure 4:
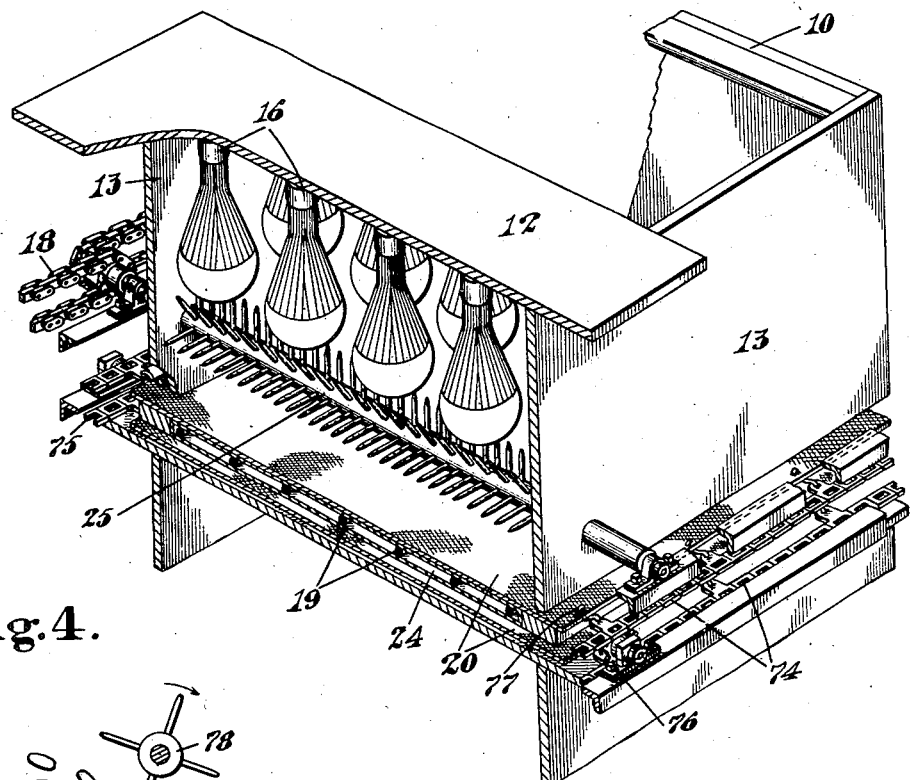
Figures 5, 6:
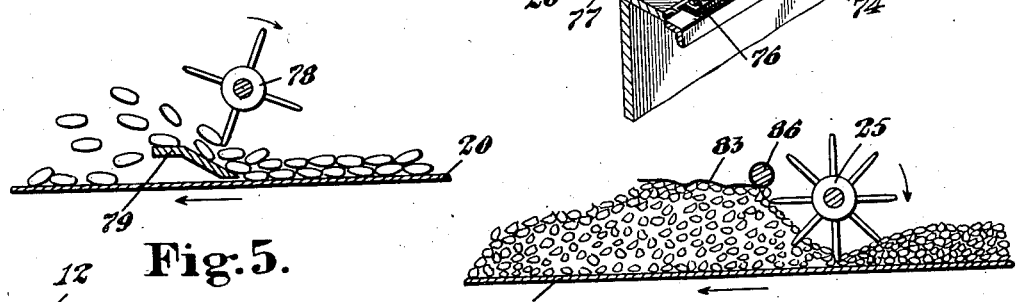
Figure 7:
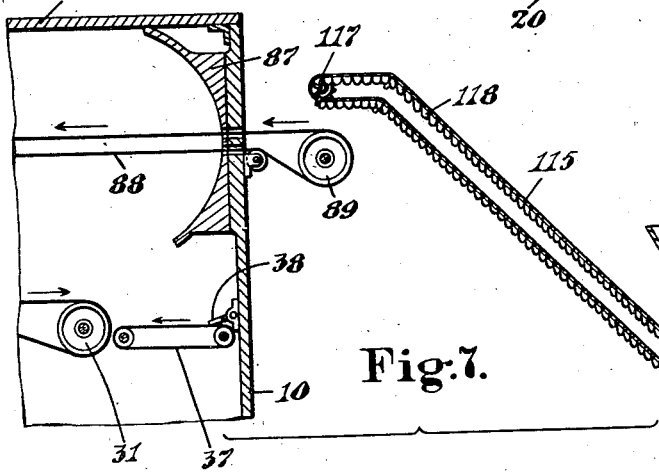
Figure 8:
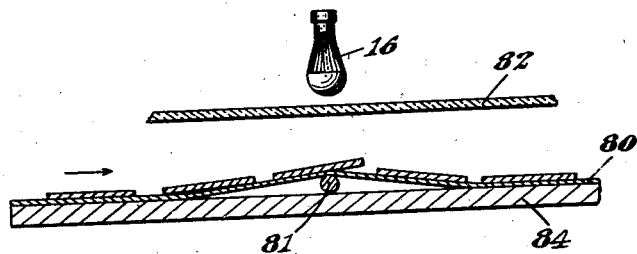
Figure 9:
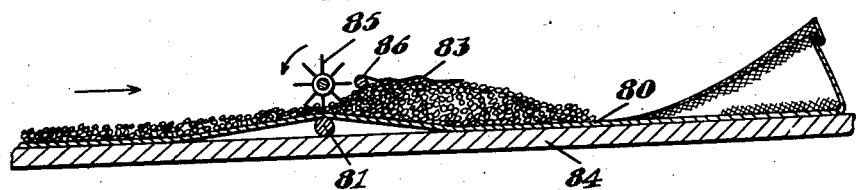
Figure 10:
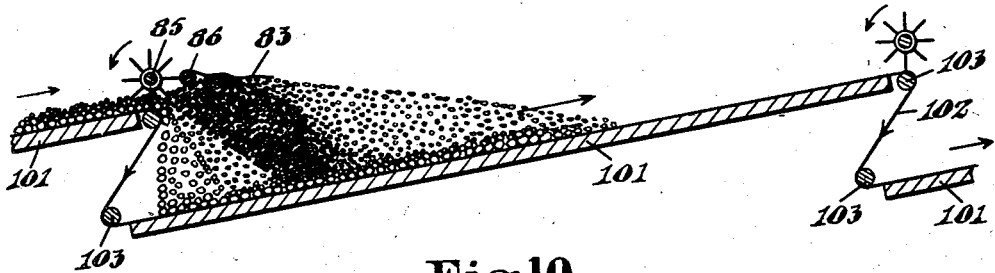
Figure 11:
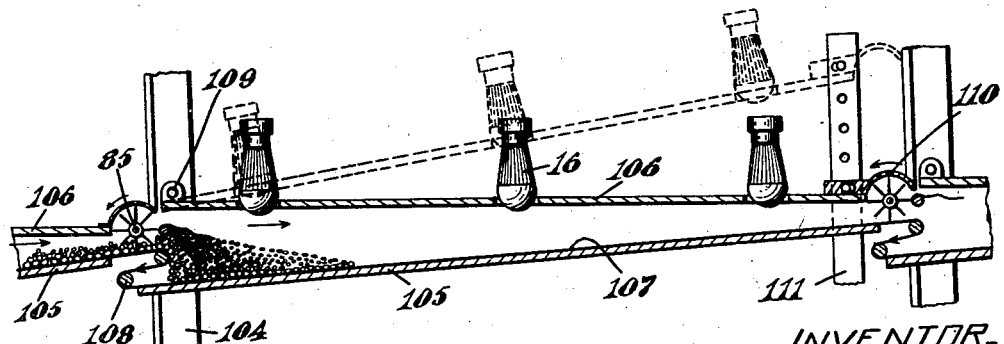

Fig. 4 is a fragmentary view in perspective, partly in cross section of a portion of the apparatus shown in Fig. 1, Figs. 5 and 6 are diagrammatic views illustrating two agitating devices and their associated parts, Fig. 7 is a diagrammatic view of an alternative feeding mechanism for supplying the product to the apparatus, Fig. 8 is a sectional view illustrating in detail the deflection of the belt from its underlying heater, Fig. 9 is a similar view showing an agitating device in operative relation to the deflecting means, Fig. 10 is a sectional view illustrating diagrammatically an alternative arrangement of the conveyor belt, and Fig. 11 is a sectional view illustrating diagrammatically an alternative form of enclosure for the conveyor belt.

The apparatus as illustrated in Figs. 1 and 4 will first be described. This comprises an elongated rectangular casing having end walls 10 and 11 and side walls made up of vertically disposed panels 13. The panels form the side walls of a series of elongated horizontal compartments each of which contains and is partially defined by a horizontal conveyor belt. The moist food product to be dehydrated is first reduced to units of suitable size and then delivered to the conveyor belt in the uppermost compartment. It is carried along a predetermined dehydrating path by the uppermost belt of the series, delivered to the next lower belt and similarly passed along and then downwardly to the other belts in the series and discharged from the apparatus. Upon the top 12 of the apparatus is mounted a hopper 14 having a rotary feeding device 15 mounted therein which is driven at a constant speed to deliver the product units at a uniform rate to the right hand end of a conveyor belt 20 which is shown herein as running over pulleys or rolls 21 and 22. These rolls may be journaled in suitable bearings provided in the frame of the casing but not shown in the drawings. To economize space the lower reach of the belt 20 is deflected upwardly by idlers 23. The upper and operative reach of the belt 20 is supported and conductively heated by a flat elongated heater 24 which, as shown in Fig. 4, contains a coil of steam pipes 19 enclosed between thin face plates.

At suitable intervals along the conveyor belt 20 are provided rotary agitating devices 25, only one of which is shown in Figs. 1 and 4. Each agitator may comprise a driven shaft having a series of radially disposed pins which, in the rotation of the shaft, pass close to the surface of the conveyor belt picking up the unit products thereon and throwing them upwardly and forwardly so that they are scattered and changed in relative position thereby exposing fresh surfaces to dehydrating influence and reducing the density of the product mass.

The belt and the product units thereon are heated by conduction by the flat underlying heater 24. The product units are also heated from above by sources of radiant energy herein shown as reflector lamps 16 carried by the top 12 of the apparatus and spaced so as to subject the product beneath them to intense radiant energy including infra-red rays which are particularly effective in heating the interior of the product units and driving moisture outwardly to the surface thereof. It will be noted that one effect of the agitating device 25 is to cause the food products to move alternatively toward and away from the sources of infra-red energy. While the principal heating of the food product units from the flat heater 24 is caused by conduction through the belt 20, the flat heater is itself a source of radiant energy so that the product units receive radiant energy both from above and from below. A range of 7500 to 25,000 Angstrom units has been found particularly effective in internally heating the product units from above so as to maintain copious surface moisture thereon in the earlier stages of the process.

In addition to heating the product units by conduction and radiation while on the belt 20, the units are subjected also to the dehydrating influence of a very hot, arid current of air or other gas while moving with or above the belt. To this end a curved guide 26 is arranged at the right hand end of the upper compartment to direct hot gas upwardly and toward the left so that it passes over the product units and through the product units which are thrown up by the agitator 25, and finally out through an outlet duct 71 located in the upper left hand corner of the apparatus. The gas in passing through this compartment is continually warmed by radiation from the flat heater 24 through the belt and by the lamps 16 so that it passes out from the apparatus at maximum temperature.

The partially dehydrated product upon reaching the left hand end of the belt 20 is discharged vertically down into the second compartment and upon the conveyor belt 30 which is arranged therein in staggered relation to the belts above and below it. A discharge opening between the two compartments is formed between the belt 20 in passing downwardly over the roll 22 and a short auxiliary conveyor belt 27 which is arranged to run horizontally over two rolls located at a lower level than the belt 20 and in the opposite direction from the movement of the belt 20, that is to say, both belts move down in the discharge opening provided between their adjacent ends. A vane or baffle 28 is pivotally mounted in the end wall 11 to rest upon the outer roll of the auxiliary belt 27 and so make a substantially tight joint at this point in the apparatus. The purpose of the auxiliary belt is to collect and return to the discharge opening that portion of the product which may be carried beyond the opening either by the action of the belt 20 or by the action of the gas current which is flowing over it.

The second compartment is similar to that already described. It has a ceiling 29 carrying a second series of lamps 16 from which radiant energy is directed upon the product delivered to the conveyor belt 30 near its left hand end and discharged into the third compartment from a discharge opening formed by the belt 30 passing over the roll 31 and an auxiliary belt 37 located at a somewhat lower level and traveling in a direction opposite to the belt 30. Idler rolls 33 are provided for deflecting the lower reach of the belt upwardly and a long flat heater 34 is provided for heating its upper reach. Rotary agitators 35 may be provided as suggested and a curved guide 36 on the left hand end of the compartment cooperates with the roll 32 in providing an inlet duct for hot arid gas.

In the third compartment is arranged a conveyor belt 40 running over the rolls 41 and 42, idle rolls 43 and a flat heater 44. One of several rotary agitating devices 45 is shown as operating in association with the conveyor belt 40. A curved shield 46 provides an air duct extending upwardly around the right hand end of the belt and an auxiliary conveyor belt 47 cooperating with a pivoted baffle plate 48 closes the left hand lower end of the compartment and provides a discharge opening to the fourth compartment.

In the fourth compartment is mounted a conveyor belt 50 running over rolls 51, 52, idler rolls 53 and a flat heater 54. The ceiling of the compartment 49 is provided with lamps constituting sources of radiant energy. An auxiliary conveyor belt 57 cooperates with a roll 51 in providing a downwardly extending discharge opening to the fifth and lowest compartment in the apparatus, in this case the auxiliary belt being provided with upstanding vanes which are convenient for handling the drier and finer food product units encountered at this stage in the process. A pivoted baffle plate 72 having its free end located above the roll 52 completes the closure of the fourth compartment.

In the left hand end wall above the baffle 72 is provided a gas inlet duct 70 through which hot or warm arid gas is supplied to the fourth compartment in the apparatus. It will be understood that this gas flows across each conveyor belt in the same direction in which the belt is moving but at a greater velocity and upwardly from compartment to compartment until it is finally discharged through the outlet ducts 71. In each compartment the gas current is heated more and more so that at each stage it is capable of carrying more and more moisture which it absorbs from the heated food product units. By the time it reaches the upper belts this gas current is, when surface-wet products are being processed, preferably hotter than the boiling point of water and so acts also directly to sweep out steam generated in the product units and in the belts themselves. It further acts to pick up and advance the lighter and drier units or fragments of the product and this function is assisted by the agitating devices which, in redistributing the product upon the conveyors, free individual units from the mass. As already explained these smaller and drier units are therefore subjected to less intense and less prolonged dehydrating treatment than the heavier units which progress through the apparatus at substantially the same speed as that of the conveyor belts.

The lowermost compartment of the apparatus contains a conveyor belt 60 running on rolls 61 and 62 and located so as to receive the partially dried product from the belt 50 in the fourth compartment of the apparatus. The belt 60 is operated at a substantially slower speed than the conveyor belts above it so that the product, which is now substantially dried, is accumulated upon this belt in a thicker layer than the product as distributed upon any of the previous belts in the series. The belt 60 is arranged to pass with clearance through an electro-conductive coil 63 so connected that a high frequency alternating current may be delivered thereto with the result that the product conveyed thereon is subjected to heat and radiant energy generated in this manner. The belt 60 moves from right to left and in the left hand lower corner of the apparatus is provided an outlet duct 65 having a rotary feeding device 66 therein by which the compartment is maintained substantially gas-tight at this point while the dehydrated product is positively discharged through the duct.

The lower compartment of the apparatus is substantially sealed from the upper compartments and is provided with a distinct gas circulating system comprising the inlet duct 67 and the outlet duct 68. Gas at any desired temperature may be admitted through the inlet duct 67 flowing toward the left over and through the product and passing downwardly through the product and the belt and outwardly through the outlet duct 68. In general the gas employed in the lower compartment may be substantially cooler than that employed in the upper compartments and in some instances it may be cooler than the product itself. For example, air admitted at 120° F. through the inlet duct 67 may encounter food product units passing downwardly from the belt 50 which are at a higher temperature. Consequently the effect of the air passing through the lower compartment is to cool the product as well as to remove residual moisture not already taken care of. On the other hand, gas or air admitted through the inlet duct 70 to the fourth compartment may enter at a temperature of about 200° F. and in passing upwardly and through the apparatus become gradually heated to an outlet temperature of 350° F.

The conveyor belts as best shown in Fig. 4 may be of canvas or other moisture absorbent material and are arranged to be supported from and carried by a pair of parallel link belts 74 and 75 arranged to run over sprockets mounted on blocks 76 on the frame of the machine. Each sixth link of the link belt is provided with a perforated lateral extension arranged to receive one end of a hook or clip 77. At their inner ends the hooks 77 are stuck through the body of the belt at appropriate points to hold it stretched under moderate tension between the two link belts. As shown in Fig. 4 the upper reach of the belt 20 is supported directly upon the flat heater 24. In operation, moisture absorbed by the belt from the material is immediately vaporized by the heater 24 so that it passes upwardly through the layer of product units on the belt as an additional heating medium. It will also be noted from an inspection of Fig. 4 that the margin of the belt 20 extends outwardly beneath the panel 13 which forms the side wall of the enclosure.

The action of the agitating devices in picking up and scattering the product and redistributing the units thereof in selected areas upon the belts is well suggested in Fig. 1. A modified arrangement of agitating device is diagrammatically illustrated in Fig. 5 where an inclined deflecting blade 79 is shown as located above the conveyor belt 20 and a rotary agitating device 78 is shown as located so as to act upon food product units after they have been initially separated from the belt by being forced up the inclined surface of the blade 79.

In Fig. 6 the rotary agitator 25 is shown in association with a flexible guard arranged to restrain the extent to which the food product units are thrown and scattered by the action of the agitator. The guard herein shown comprises a flexible sheet 83 secured at one end to a transverse shaft 86 extending parallel to the axis of the agitator at a slightly higher level and to the rear thereof. The sheet 83 is blown into a substantially horizontal position by the gas current flowing over the conveyor belt 20 and acts as a floating streamer to limit the height to which the units may be thrown by the agitator and to direct them back toward the surface of the belt 20.

Optional features of construction are illustrated in Fig. 8 in which a section of conveyor belt 80 is shown as supported and heated by a flat heater 84. In handling a sticky product, such as slices of potato or onions, it is desirable to break the product periodically away from the conveyor belt and to change the spacial relation of the product units. This may be effected by inserting a deflecting member such as a transverse rod 81 between the heater and the belt as suggested in Fig. 8. The belt is thus deflected in a limited area away from the heater in inclined paths forming a transverse vertex ridge in the belt and in passing over the vertex or crest the product units are separated from the belt and shifted with respect to each other.

In this figure there is also shown as interposed between the product on the belt and a source of radiant energy comprising one of the lamps 16 a sheet of glass 82 or other transparent material which is pervious to infra-red radiation in length between 7500 and 25,000 Angstrom units. While neither the deflecting element 81 nor the transparent sheet 82 is shown in the apparatus illustrated in Fig. 1 it will be understood that either or both of them may be employed wherever it is advisable to do so. The transparent sheet is useful as a guard preventing actual contact of the product units with the lamps 16 and also as an element defining a duct for the passage of the dehydrating gas.

In Fig. 9 the deflecting device 81 is shown as arranged in cooperation with one of the rotary agitating devices 85 and with a streamer guard 83 of the character already described in connection with Fig. 6. In this figure also a portion of the conveyor belt 80 is represented as being turned up to show a longitudinal pleat therein. As already intimated this provides surplus material in the belt which may be drawn upon for purposes of adjustment or replacement in case of shrinkage.

An alternative arrangement of the conveyor belt is illustrated in Fig. 10. This has been disclosed heretofore as moving horizontally over a horizontally disposed heater, but in some instances it may be desirable to arrange the conveyor belt to travel in a discontinuous path. This may be effected as shown in Fig. 10 by arranging a series of consecutive heaters 101 in inclined staggered relation and in guiding the belt 102 over suitably arranged idle rolls so that its path follows the surface of the heaters dropping from the end of one heater and traveling in a forward and upwardly inclined path along the surface of the next heater in the series. The path of the belt is preferably such that it slopes downwardly and rearwardly in passing from one heater to the next, and is thus carried away from the path of the product units which either fall vertically or are carried ahead of a vertical path by the gas stream which is directed over the conveyor belt and the product thereon.

Fig. 9 discloses also a rotary agitator 85 located just above one of the vertices in the conveyor belt and asociated with a flexible guard streamer 83 for restricting the path of the lighter food product units as they leave the agitator.

In Fig. 11 is illustrated a form of apparatus in which the conveyor belt and the gas current are directed through a series of elongated tapering passages or enclosures that may be termed ducts or Venturi sections. Such construction may be employed where it is desired to intensify the gravity separation or winnowing of the drier from the moister food product units. This results from the increased velocity of the gas current in the constricted sections of the tapering duct or enclosure. Referring particularly to Fig. 11, it will be noted that the bottom of the duct is formed by a flat bottom plate or heater 105 and a top plate 106 both of which are shown as supported upon angle iron portions 104 of the frame. The conveyor belt 107 is directed through the duct by idle rolls 108 in a sinuous path and a rotary agitator 85 may be provided at the larger end of the section of the enclosure. The top plate is perforated and carries sources of radiant energy herein shown as reflector lamps 16. The energy of these lamps is directed upon the food product units conveyed beneath them by the belt 107 or by the gas current flowing through the duct. Preferably in this duct and in the compartments of Fig. 1, the walls will be made of or coated with material for reflecting the radiant energy from the walls to the food product in the process of treatment.

As shown in Fig. 11 the upper hot plate 106 of the constricted section is pivotally mounted at its left hand end on a shaft 109 and may be swung about this axis into different angular positions as suggested in dotted lines. For this purpose a vertical stationary bar 111 is associated with the frame of the apparatus and provided with spaced holes opposite to any one of which the right hand end of the top plate 106 may be secured by a transverse pin passing into a perforated portion of the agitator guard 110. An advantage of this construction is that in dehydrating such products as prunes, raisins or strawberries which require a longer time of treatment and less intense radiant heat and relatively cooler dehydrating gas than smaller product units, these results may be brought about by widening the constriction of the air passage. In this way the hot plate radiant source is moved further from the product and the cross section of the gas duct is increased so that a greater volume of gas is circulated over the product without increasing its velocity through the apparatus. The increased volume of air is moreover correspondingly less heated under conditions of adjustment providing greater cross sectional area in the duct.

In Figs. 2 and 3 is conventionally represented mechanism for supplying to the dehydrated product a small amount of wetting agent and for compressing the dried product into solid cakes. To this end a spray pipe 69 is arranged to deliver a fine mist of liquid wetting agent to the dehydrated product as it leaves the belt 60. A rotatable disk 90 having a series of cylindrical cavities 91 therein is arranged to rotate in step by step manner upon a vertical shaft 92 beneath the outlet duct 65. A stationary funnel member 93 directs the product into the successive cavities of the disk 90 at the station shown at the right hand side of the illustrated mechanism. A stationary segment plate 96 underlies the disk 90 except at the ejecting station. A compressing plunger 94 acts upon each full cavity to compress the food product into a solid cylindrical cake 100 and at the ejection station an ejecting plunger 95 acts to eject the completed cake.

Alternative mechanism for supplying the food product units of the apparatus is illustrated in Fig. 7. This may be employed in place of or as a supplement to the hopper 14 and feeder shown in Fig. 1. The essential feature of this mechanism is a pocket conveyor comprising parallel link belts or chains 115 having between them a flexible sheet which is stretched transversely but caught up at intervals so that it hangs in bags or folds which may be filled with the product units on the ascending side of the conveyor, but which turn themselves inside out in reaching the descending side of the conveyor.

In Fig. 7 a horizontal conveyor belt is represented as delivering to a hopper 112 having a rotary feeding device 114 near its outlet end. The conveyor chains run over sprockets 116-117 and idle sprockets so arranged as to direct the chains upwardly in an inclined path from the discharge end of the hopper 12 to a horizontal delivery position above a conveyor belt 88 which forms part of the dehydrating apparatus. This is shown as guided at one end by a roll 89 mounted outside the end wall 10 of the enclosure and passing inwardly through a concave guide member 87 where it functions as the uppermost conveyor belt of a series as in the apparatus already described. The pockets 118 of the inclined conveyor are filled progressively by the hopper 112, pass upwardly and forwardly to the sprocket 117 where they are dumped upon the conveyor belt 88 and then turn themselves inside out as they pass rearwardly and downwardly in the conveyor. A lateral duct, not shown, is provided for passing the dehydrating gas current around and past the belt 88 since there is no room for its passage within the casing at the end of the belt.

The transparent baffle 82 shown in Fig. 8 has the additional function of protecting the lamp 16 against cooling by the gas current. It will be noted that the absorbent conveyor belts are fully exposed and entirely uncovered by the product in their return in the lower pass. Thus an opportunity is offered for the belt to become completely dried by heat from the flat heaters and action of the dehydrating gas current before being presented in position to receive the moisture-containing food product. It will be understood that the rotary agitating devices may have in addition to their picking up and distributing function, also a shredding function tending to reduce the size of the product units in their passage through the apparatus.

The various alternative and adjustable features of the apparatus herein described are useful in that by taking advantage of them it is possible to adapt the same apparatus to handle different products so that it may be used the whole season through. For example, it may be adjusted to handle successively peas, strawberries, beans and potatoes as they ripen during the progress of a single season.

Having thus disclosed my invention and described a specific embodiment thereof in detail, I claim as new and desire to secure by Letters Patent:

1. In dehydrating apparatus, the combination of a flat traveling conveyor, means for distributing food units in a layer thereon, means for redistributing the said units in selected areas upon the conveyor and thereby freeing individual units from the layer, and means for flowing a current of gas over and among the food units in the direction of conveyor travel, whereby the lighter and drier food units are advanced at a faster rate than the heavier and moister units of the food being treated.

2. In dehydration apparatus, a series of superposed enclosures, a series of horizontally moving conveyors each mounted in an enclosure and constituting a partition and in part defining the same, heaters supporting certain of said conveyors, and means for directing a current of gas moving upwardly from conveyor to conveyor and concurrently over two adjacent conveyors of the series.

3. In an apparatus for dehydrating food units, the combination of a casing, a product conveyor movable therein, means for supplying food units to the same, a second product conveyor located adjacent to the discharge end of said first conveyor and adapted to return product toward said first conveyor, and means for blowing some of the food units from the first to the second conveyor, there being a space between the discharge ends of the two conveyors in which product units discharged from both conveyors are commingled.

4. In dehydrating apparatus, a conveyor for carrying food units, means for directing a current of gas over units on said conveyor, rotary means for lifting units from the conveyor into the gas current, and a streamer of flexible sheet material mounted adjacent to said rotary lifting means and arranged to restrain the units so lifted.

5. In dehydrating apparatus, a flexible conveyor for carrying food product units, a heater supporting the conveyor throughout a portion of its path, means for forming at all times a transverse ridge in the moving conveyor, a rotary agitator located adjacent to said ridge for lifting the product units from the conveyor, and means for directing a current of gas among the lifted product units.

6. In dehydrating apparatus, a flexible conveyor for carrying food product units, means for guiding the conveyor in a path having permanent crests and troughs therein, means for directing a current of gas concurrently and longitudinally above said conveyor, and an agitating device located adjacent to a crest in the path of the conveyor.

7. In dehydrating apparatus, a flexible conveyor belt for carrying a layer of food units, means for guiding said belt in a circuitous path having upwardly-sloping sections and downwardly-directed sections acting to disturb the continuity of the said layer, and means for directing a current of gas longitudinally and concurrently along said belt whereby the drier units are picked up and advanced in the disturbed areas.

8. In dehydrating apparatus, a flexible conveyor belt for carrying food units, means for guiding the belt in a circuitous path wherein the food units are alternately advanced forwardly and upwardly in an inclined direction and then allowed to fall by gravity to the belt in a lower portion of its path, and means for passing a gas current through the apparatus in such a direction and at such a velocity that it will advance some of the drier units further along and above the belt in the direction of belt travel than the moister units.

9. In dehydrating apparatus, a horizontally-disposed casing tapering progressively toward one end and then opening into a section of enlarged cross section, a conveyor adapted to carry food units longitudinally through the casing toward its smaller end, and means for passing hot dehydrating gas through the casing at a velocity increasing toward the smaller end of the casing with a winnowing action selectively advancing the drier units along and above the belt in the direction of belt travel.

10. In dehydrating apparatus, a substantially horizontally-disposed duct having upper and lower walls relatively adjustable to impart different degrees of constriction to the duct, a conveyor for moving food units longitudinally through the duct, and means for directing a concurrent flow of gas through the duct in contact with the product.

11. In dehydrating apparatus, a flexible moisture-absorbent conveyor for food units, means for moving the conveyor, a heater supporting the conveyor, a source of radiant energy located above the conveyor, and means for deflecting the entire conveyor with the product thereon away from the heater and toward said source of radiant energy.

12. In a food-dehydrating apparatus, the combination of a gas duct, a traveling conveyor adapted to carry food units through the duct, means for supplying radiant energy to the food while within the duct, means for causing the individual units of the product to change their spacial relationship to each other and to the source of radiant energy while passing through the duct, and means for causing a current of dehydrating gas to pass through the duct in the same direction as the product movement at a velocity sufficient to cause those product units having a less-than-average specific gravity to move through the duct faster than those units having a greater-than-average specific gravity.

13. In food dehydration apparatus, the combination with an enclosure formed in part by side panels, of a food product conveyor comprising spaced parallel link belts movable in paths outside the respective side panels of the enclosure, a textile web stretched between said link belts and extending through passages in the side panels, a heater underlying said web between the side panels, a source of radiant heat located above said web between the side panels, and means for directing a current of dehydrating gas in a path above said web.

14. In dehydrating apparatus, a series of superposed enclosures, a series of horizontally-moving conveyors mounted in said enclosures, heaters supporting certain of said conveyors, and means for directing a current of dehydrating gas upwardly through the apparatus and through the enclosures thereof concurrently with the conveyor movement in at least two adjacent enclosures.

CLARENCE BIRDSEYE.

REFERENCES CITED

The following references are of record in the file of this patent:

UNITED STATES PATENTS

| Number | Name | Date |
|---|---|---|
| 234,412 | Lee et al. | Nov. 16, 1880 |
| 1,161,301 | Frantz | Nov. 23, 1915 |
| 1,040,486 | Allen | Oct. 8, 1912 |
| 1,118,884 | Allen | Nov. 24, 1914 |
| Re. 16,699 | Cano | Aug. 9, 1927 |
| 2,168,532 | McMath et al. | Aug. 8, 1929 |
| 1,184,228 | Carter | May 23, 1916 |
| 794,402 | Goldman | July 11, 1905 |
| 2,215,418 | Belcher | Sept. 17, 1940 |
| 1,791,054 | Dalton | Feb. 3, 1931 |
| 1,578,617 | Van Houten | Mar. 30, 1926 |
| 1,919,275 | Dunham | July 25, 1933 |
| 708,946 | Welch | Sept. 9, 1902 |
| 676,165 | Wacker | June 11, 1901 |
| 546,830 | Smith | Sept. 24, 1895 |
| 1,463,923 | Nelson | Aug. 7, 1923 |
| 1,086,194 | Marquis | Feb. 3, 1914 |
| 1,275,547 | Forrest | Aug. 13, 1918 |
| 1,353,167 | Luther | Sept. 21, 1920 |
| 1,459,211 | Kalisz | June 19, 1923 |
| 1,910,868 | Webb | May 23, 1933 |
| 1,346,986 | Stamm | July 20, 1920 |
| 931,873 | Hough et al. | Aug. 24, 1909 |
| 1,836,525 | Capps | Dec. 15, 1931 |
| 2,326,115 | Arthur | Aug. 10, 1943 |
| 1,345,301 | Winchester | June 29, 1920 |
| 1,355,091 | Davies | Oct. 5, 1920 |
| 554,838 | Schrebler | Feb. 18, 1896 |
| 686,837 | Smith | Nov. 19, 1901 |
| 1,520,187 | Lawson | Dec. 23, 1924 |
| Re. 6,361 | Reynolds | Mar. 30, 1875 |
| 980,252 | Hayden | Jan. 3, 1911 |
| 1,446,580 | Perry | Feb. 27, 1923 |
| 2,360,257 | Muller et al. | Oct. 10, 1944 |

FOREIGN PATENTS

| Number | Country | Date |
|---|---|---|
| 2,055 | British | Feb. 5, 1899 |
| 9,859 | British | May 1, 1903 |
| 3,158 | British | Dec. 24, 1860 |
| 23,124 | British | Dec. 1, 1893 |
| 9,308 | British | Apr. 24, 1903 |
| 148,082 | British | July 29, 1920 |
| 160,885 | British | Mar. 29, 1921 |
| 464,758 | British | Apr. 20, 1937 |
| 19,919 | German | Nov. 7, 1882 |
| 229,909 | German | Jan. 10, 1911 |
| 400,947 | French | June 29, 1909 |
| 50,883 | Austrian | Nov. 29, 1911 |
| 460,306 | British | Jan. 26, 1937 |